United States Patent
Zuo et al.

(10) Patent No.: US 11,429,533 B2
(45) Date of Patent: Aug. 30, 2022

(54) METHOD AND SYSTEM OF REDUCING ADDRESS MAPPING SPACE OF FLASH TRANSLATION LAYER

(71) Applicant: SHENZHEN UNIONMEMORY INFORMATION SYSTEM LIMITED, Shenzhen (CN)

(72) Inventors: Jian Zuo, Shenzhen (CN); Yuanyuan Feng, Shenzhen (CN); Zhiyuan Leng, Shenzhen (CN); Jintao Gan, Shenzhen (CN); Weiliang Wang, Shenzhen (CN); Zongming Jia, Shenzhen (CN)

(73) Assignee: SHENZHEN UNIONMEMORY INFORMATION SYSTEM LIMITED, Guangdong (CN)

( * ) Notice: Subject to any disclaimer, the term of this patent is extended or adjusted under 35 U.S.C. 154(b) by 0 days.

(21) Appl. No.: 17/037,156

(22) Filed: Sep. 29, 2020

(65) Prior Publication Data
US 2021/0019265 A1    Jan. 21, 2021

Related U.S. Application Data

(63) Continuation-in-part of application No. PCT/CN2020/076594, filed on Feb. 25, 2020.

(30) Foreign Application Priority Data

Feb. 26, 2019 (CN) .......................... 201910142830.0

(51) Int. Cl.
*G06F 12/10* (2016.01)
*G06F 12/1009* (2016.01)
(Continued)

(52) U.S. Cl.
CPC ...... *G06F 12/1009* (2013.01); *G06F 12/0292* (2013.01); *G06F 12/0802* (2013.01); *G06F 2212/2022* (2013.01)

(58) Field of Classification Search
CPC ......... G06F 2212/2022; G06F 12/1009; G06F 12/0292; G06F 12/0802
(Continued)

(56) References Cited

U.S. PATENT DOCUMENTS

2017/0109089 A1    4/2017  Huang

FOREIGN PATENT DOCUMENTS

| CN | 104679440 A | 6/2015 |
| CN | 106354664 A | 1/2017 |

(Continued)

OTHER PUBLICATIONS

International Search Report for Application No. PCT/CN2020/076594.

(Continued)

*Primary Examiner* — Hua J Song
(74) *Attorney, Agent, or Firm* — Cantor Colburn LLP

(57) ABSTRACT

A method of reducing FTL address mapping space, including: S1, obtaining a mpa and an offset according to a logical page address; S2, determining whether the mpa is hit in a cache; S3, determining whether a NAND is written into the mpa; S4, performing a nomap load operation, and returning an invalid mapping; S5, performing a map load operation; S6, directly searching a mpci representing a position of the mpa in the cache and searching a physical page address gppa with reference to the offset; S7, determining whether a mapping from a logical address to a physical address needs to be modified; S8, modifying a mapping table corresponding to the mpci in the cache, and marking a mp corresponding to the mpci as a dirty mp; S9, determining whether to trigger a condition of writing the mp into the NAND; and S10, writing the dirty mp into the NAND.

15 Claims, 3 Drawing Sheets

(51) Int. Cl.
*G06F 12/02* (2006.01)
*G06F 12/0802* (2016.01)
(58) Field of Classification Search
USPC .......................................................... 711/103
See application file for complete search history.

(56) References Cited

FOREIGN PATENT DOCUMENTS

| CN | 106775466 A | 5/2017 |
| CN | 108153682 A | 6/2018 |
| CN | 109918316 A | 6/2019 |

OTHER PUBLICATIONS

Translation to International Search Report for Application No. PCT/CN2020/076594.
Written Opinion for Application No. PCT/CN2020/076594.

METHOD AND SYSTEM OF REDUCING ADDRESS MAPPING SPACE OF FLASH TRANSLATION LAYER

CROSS-REFERENCE TO RELATED APPLICATIONS

This application is a continuation-in-part of PCT patent application Serial No. PCT/CN2020/076594, with an international filing date of Feb. 25, 2020, which claims priority to Chinese patent application No. 201910142830.0 filed with Chinese patent office on Feb. 26, 2019, and entitled "method and system of reducing FTL address mapping space", the disclosure each of which are incorporated herein by reference in their entirety.

TECHNICAL FIELD

The present disclosure belongs to the technical field of solid state disk, and particularly relates to a method of reducing address mapping space of flash translation layer and a system of reducing address mapping space of flash translation layer.

BACKGROUND

FTL (Flash Translation Layer) algorithm is the core part of a SSD (Solid State Disk) firmware that requires to maintain the mapping from logical address to physical address because NAND does not allow repeatedly writing on the page. At present, SSD firmware needs to maintain all mappings from logical pages to physical pages in a RAM in the event that a page mapping method is adopted; however, RAM resources in the SSD are limited and expensive. If 4 Kb is taken as an unit of page mapping, assuming that 1 table option in the page mapping takes 4B storage space, a RAM with 128 Mb storage space is required for storing page mapping tables in a hard disk having a storage space of 128 Gb, which undoubtedly increases the cost of the SSD.

The most essential work of the FTL is address mapping, at present, the common address mapping of SSD firmware is divided into block mapping, page mapping and hybrid mapping; page is taken as a mapping unit in the page mapping, each logical page address corresponds to one single physical page address; in order to pursue a better randomness performance (which is important for an operating system), the manner of page mapping is used in a plurality of solid state disks, however, due to the fact that the number of pages in a flash memory are far more than the number of blocks in the flash memory, more space for storing mapping tables are required in the SSD, in order to store the mapping tables, most of the current solid state disks generally store buffer data and mapping tables in a DRAM (Dynamic Random Access Memory), which has the advantages that the mapping table is searched and updated rapidly and the performance is much better, and has the disadvantages that one more DRAM is required, the cost and the power consumption are increased; moreover, the DRAM is expensive, so that the requirement cannot be met.

Technical Problem

An objective of embodiments of the present disclosure is providing a method and a system of reducing address mapping space of flash translation layer, which aims at reducing the cost of RAM and saving the cost of hardware.

Technical Solution

In order to solve the technical problem as mentioned above, the technical solutions adopted in the embodiments of the present disclosure are as follows:

In a first aspect, a method of reducing a flash translation layer address mapping space is provided, this method includes steps of:

S1, obtaining a mapping page address and an offset according to a logical page address;

S2, determining whether the mpa is hit in a cache; performing S6 if the mpa is hit in the cache; performing S3 if the mpa is not hit in the cache;

S3, determining whether Not AND is written into the mpa; performing S5 if the NAND is written into the mpa; or performing S4 if the NAND is not written into the mpa;

S4, performing a nomap load operation, returning an invalid mapping, and turning to S7;

S5, performing a map load operation;

S6, directly searching a mapping page cache index representing a position of the mpa in the cache, and searching a physical page address with reference to the offset;

S7, determining whether a mapping from a logical address to a physical address needs to be modified; performing S8, if the mapping from the logical address to the physical address needs to be modified; or terminating operation if the mapping from the logical address to the physical address need not to be modified;

S8, modifying a mapping table corresponding to the mpci in the cache, and marking a mapping page corresponding to the mpci as a dirty mp;

S9, determining whether to trigger a condition of writing the mp into the NAND; performing S10, if it is determined that the condition of writing the mp into the NAND is triggered; or terminating operation if it is determined that the condition of writing mp into NAND is not triggered;

S10, writing the dirty mp into the NAND.

In a second aspect, a computer device is provided, the computer device includes a memory, a processor and a computer program stored in the memory and executable by the processor, the processor is configured to, when executing the computer program, implement steps of:

S1, obtaining a mpa and an offset according to a logical page address;

S2, determining whether the mpa is hit in a cache; performing S6 if the mpa is hit in the cache; performing S3 if the mpa is not hit in the cache;

S3, determining whether a NAND is written into the mpa; performing S5 if the NAND is written into the mpa; or performing S4 if the NAND is not written into the mpa;

S4, performing a nomap load operation, returning an invalid mapping, turning to S7;

S5, performing a map load operation;

S6, directly searching a mpci representing a position of the mpa in the cache, and searching a physical page address with reference to the offset;

S7, determining whether a mapping from a logical address to a physical address needs to be modified; performing S8, if the mapping from the logical address to the physical address needs to be modified; or terminating operation, if the mapping from the logical address to the physical address need not to be modified;

S8, modifying a mapping table corresponding to the mpci in the cache, and marking a mp corresponding to the mpci as a dirty mp;

S9, determining whether to trigger a condition of writing the mp into the NAND; performing S10 if it is determined that the condition of writing the mp into the NAND is triggered; or terminating operation if it is determined that the condition of writing mp into NAND is not triggered;

S10, writing the dirty mp into the NAND.

In a third aspect, a computer readable storage medium is provided, the computer readable storage medium stores a computer program, the computer program is configured to, when being executed by a processor, implement the steps in the method of reducing address mapping space of flash translation layer.

The method and system of reducing address mapping space of flash translation layer provided by the embodiments of the present disclosure have the advantageous effects that the method of using cache space to dynamically manage address mapping tables is used to replace the method of loading all address mapping tables into the RAM, so that the cost spent on RAM is reduced, and the cost spent on hardware is saved; the storage space of FTL address mapping tables is reduced, the cost of the RAM of the SSD is reduced, and the requirement may be better met, under the condition that the influence to the performance is limited.

BRIEF DESCRIPTION OF THE DRAWINGS

In order to explain the embodiments of the present disclosure more clearly, a brief introduction regarding the accompanying drawings needed to be used for describing the embodiments or exemplary techniques is given below; it is apparent that the accompanying drawings described herein are only some embodiments of the present disclosure, the person of ordinary skill in the art may also acquire other drawings according to the current drawings on the premise of paying no creative labor.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the embodiments described in detail herein are merely intended to illustrate but not to limit the present disclosure.

Figure 1:
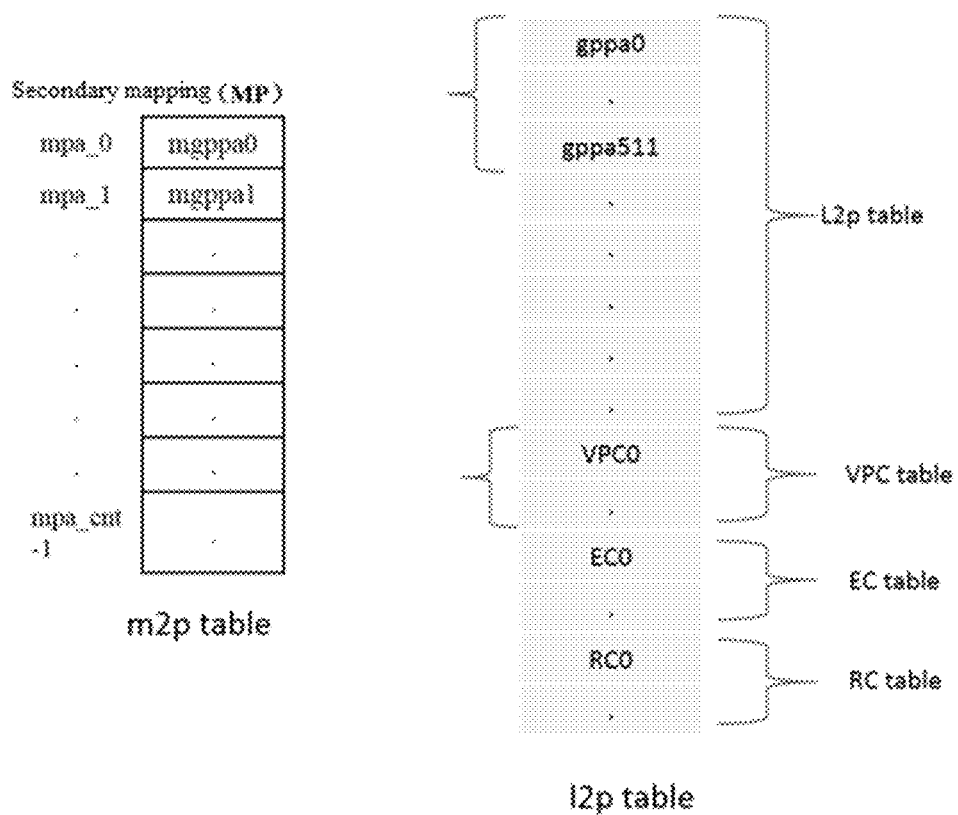
FIG. 1 illustrates a schematic diagram of an address mapping method in the related art, that is, page mapping.
Figure 2:
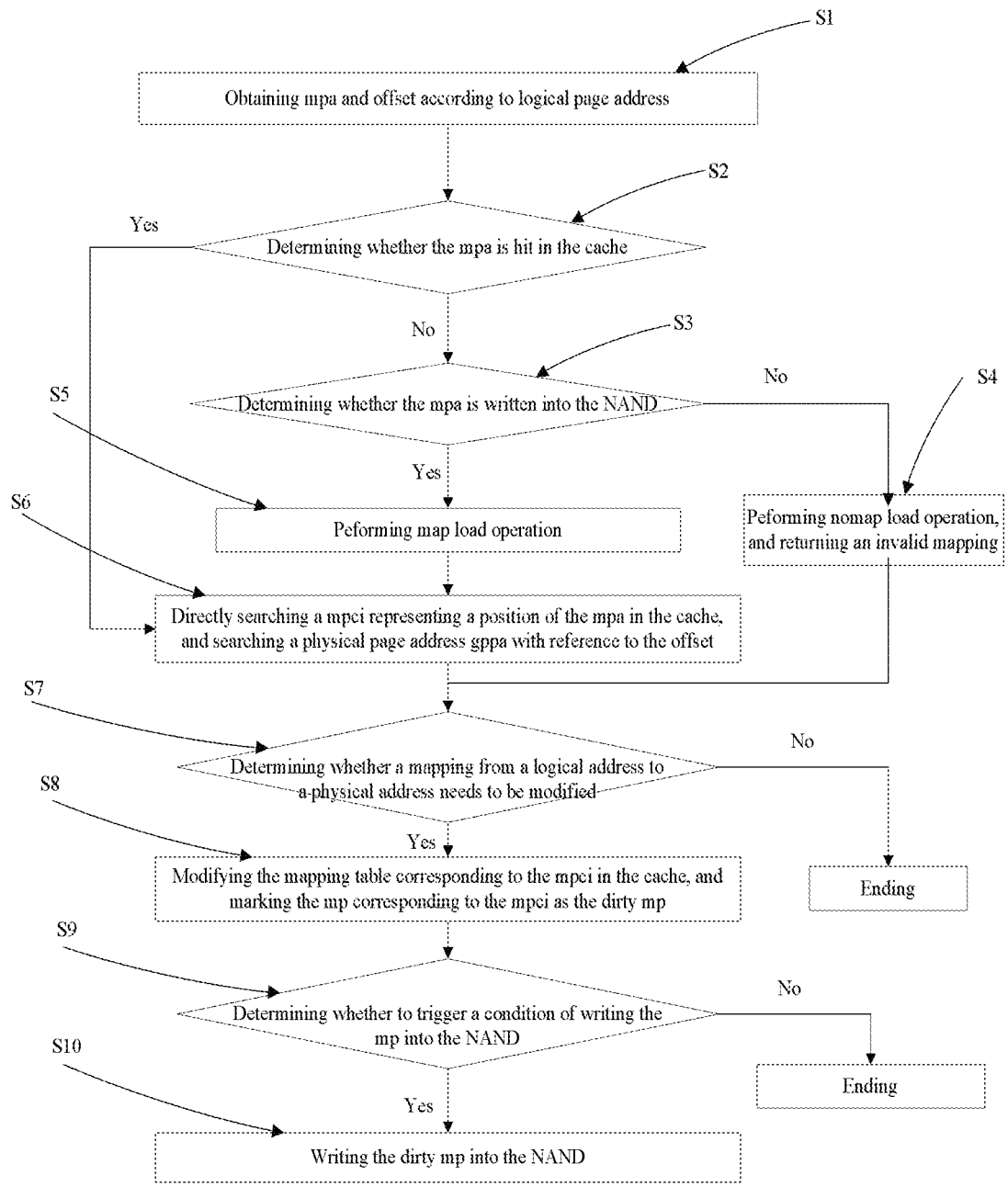
FIG. 2 illustrates a flowchart of a method of reducing address mapping space of flash translation layer in the present disclosure.
Figure 3:
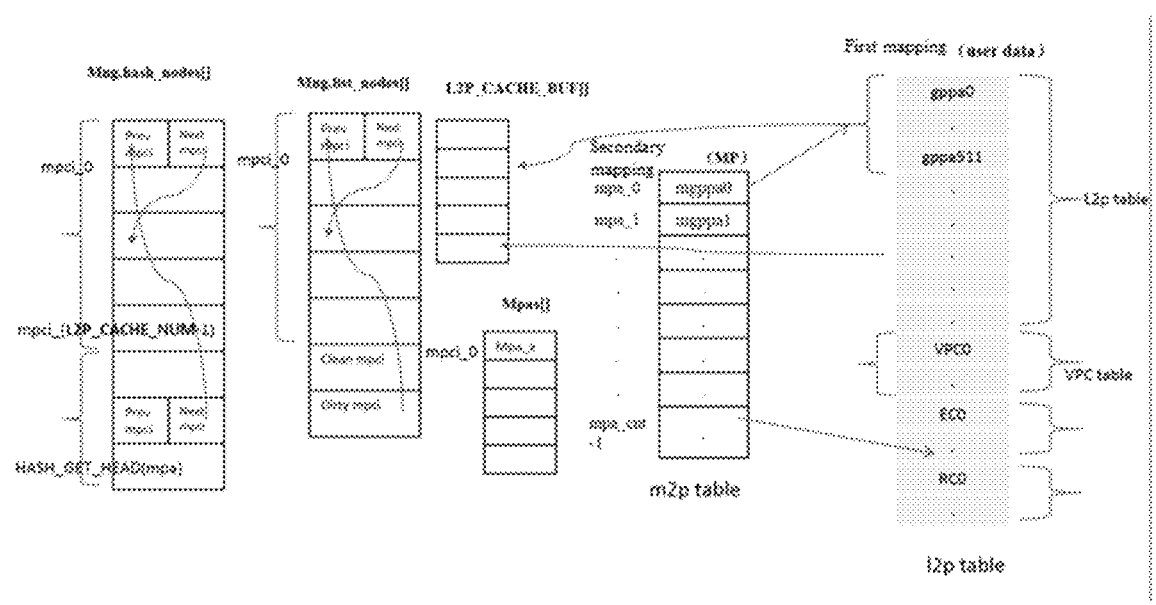
FIG. 3 illustrates a flowchart of using the method of reducing address mapping space of flash translation layer in the present disclosure.

As shown in FIGS. 1 to 3, wherein in the prior art as shown in FIG. 1, the most essential work of FTL (Flash Translation Layer) is address mapping. At present, the common address mapping of SSD (Solid State Disk) firmware is divided into block mapping, page mapping and hybrid mapping. The page mapping takes page as a mapping unit, each logical page address corresponds to one single physical page address, in order to pursue much better randomness performance which attracts more attentions of an operating system, this manner of page mapping is used in many solid state disks, however, the SSD requires more storage space to store the mapping table because that the number of pages in a flash memory are far more than the number of blocks in the flash memory. Tables such as l2p and VPC in a system are allocated in a RAM (Random Access Memory), a table m2p records the position where the table l2p is stored in the NAND. If 4 Kb is used as the unit of page mapping, assuming that 1 table option in the page mapping occupies storage space of 4 Byte, a hard disk having the storage capacity of 128 GB requires a storage space of 128 Mb for storing page mapping table l2p, which undoubtedly increases the cost of the SSD; in order to store this mapping table, most of the current solid state disks generally store buffer data and mapping tables in a DRAM (Dynamic Random Access Memory). The advantage is that searching and updating a mapping table can be performed rapidly, the performance is good, the disadvantage is that one more DRAM is required, the cost and the power consumption are increased; moreover, DRAM is very expensive.

As shown in FIGS. 2 and 3, the present disclosure discloses a method of reducing address mapping space of flash translation layer, including the following steps:

in S1, obtaining a mpa and an offset according to a logical page address;

in S2, determining whether the mpa is hit in a cache; performing S6 if the mpa is hit in the cache; performing S3 if the mpa is not hit in the cache;

in S3, determining whether a NAND is written into the mpa; performing S5 if the NAND is written into the mpa; or performing S4 if the NAND is not written into the mpa;

in S4, performing a nomap load operation, returning an invalid mapping, and turning to S7;

in S5, performing a map load operation;

in S6, directly searching a mpci representing a position of the mpa in the cache, and searching a physical page address with reference to the offset;

in S7, determining whether a mapping from a logical address to a physical address needs to be modified; performing S8, if the mapping from the logical address to the physical address needs to be modified; or terminating operation if the mapping from the logical address to the physical address need not to be modified;

in S8, modifying a mapping table corresponding to the mpci in the cache, and marking a mp corresponding to the mpci as a dirty mp;

in S9, determining whether to trigger a condition of writing the mp into the NAND;

performing S10, if it is determined that the condition of writing the mp into the NAND is triggered; or terminating operation if it is determined that the condition of writing the mp into the NAND is not triggered;

in S10, writing the dirty mp into the NAND.

Wherein the MP represents a packet in which page mapping tables and other tables are grouped according to a certain number and a rule, and the mpa represents a packet number.

Wherein in S2, which linked list in a hash_list is to be traversed is calculated according to the packet number mpa, all mpcis in the linked list are traversed with reference to the mapping page address size table until the packet number mpa is found, the current mpci is recorded, failing to find the packet number mpa represents a miss.

Wherein, in S4, the nonmap load operation is fetching the mpci from a header of a clean_list in a list_node and placing the mpci at the end of the clean_list, and then replacing cache content corresponding to the mpci with data loaded from the NAND, updating the table mpas, updating an index mpci with a new packet number mpa.

In S5, the map load operation is fetching the mpci from a header of a clean_list in a list_node and placing the mpci at the end of the clean_list, and then replacing cache content corresponding to the mpci with data loaded from the NAND, updating the table mpas, updating an index mpci with a new packet number mpa.

As shown in FIG. 3, wherein tables l2p, VPC and EC refer to the tables stored in the NAND and these tables are discontinuous, these tables are grouped by the number of 512, and are numbered (mpa) subsequently; table m2p stores the address of each packet mp in the NAND; L2P_CACHE_BUF represents a cache generated in the RAM, cache block is indexed by the mpci, each cache block stores one mp data; table mpas stores various mapping page cache indexes which represent the positions where the corresponding packets mps are stored; hash node provides X linked lists configured to be linked to mpci occupied by a loaded packet mp, it is apparent according to the packet number mpa that the packet mp corresponding to the packet number mpa may only exist in one of the X linked lists, providing multiple linked lists is for the convenience of looking up tables faster; hash node provides a clean_list and a dirty_list which are also linked to the loaded mpci, the index mpci in the clean_list indicates that the mpci is not modified after it is loaded, the index mpci in the dirty_list indicates that the mpci is modified after it is loaded.

In the present disclosure, the address mapping tables are grouped and numbered, cache space is allocated to dynamically load address mapping tables in the RAM, and the modified packet mp is written into the NAND at a predetermined time; this method saves large RAM memory and effectively conserves the cost of resources of SSD under the condition that the influence to the performance is limited, as compared to the method of fully loading the address mapping tables into the RAM.

In the present disclosure, loading all address mapping tables into the RAM is replaced by allocating a cache space for dynamically managing address mapping table; a cache space capable of loading N packets mps is allocated, and a structure management is established; when looking up a table, whether the corresponding packet mp is hit in the cache may be determined firstly, if the corresponding packet mp is not hit in the cache, the packet mp may be dynamically loaded; the packet mp which is modified after being loaded is marked, and a mechanism for writing the packet mp into the NAND at designated time is provided; the firmware of the SSD product uses the method of using cache space to dynamically manage address mapping tables instead of the method of loading all address mapping tables into the RAM, the cost spent on RAM is reduced, the cost spent on hardware is saved, the memory space of the FTL address mapping table and the cost of RAM of the SSD are reduced, and the requirement may be better met under the condition that the influence to the performance is limited.

In one embodiment of the present disclosure, the present disclosure further provides a computer device, including a memory, a processor and a computer program stored in the memory and executable by the processor, the processor is configured to implement the steps in the various method embodiments described above when executing the computer program.

In one embodiment of the present disclosure, the present disclosure further provides a computer readable storage medium which stores a computer program, the computer program is configured to implement the steps in the various embodiments described above when being executed by a processor.

The person of ordinary skilled in the art may be aware of that, a whole or a part of flow process of implementing the method in the aforesaid embodiments of the present disclosure may be accomplished by using computer program to instruct relevant hardware. The computer program may be stored in a non-volatile computer readable storage medium, when the computer program is executed, the steps in the various method embodiments described above may be included. Any references to memory, storage, databases, or other media used in the embodiments provided herein may include non-volatile and/or volatile memory. The non-volatile memory may include ROM (Read Only Memory), programmable ROM, EPROM (Electrically Programmable Read Only Memory), EEPROM (Electrically Erasable Programmable Read Only Memory), or flash memory. The volatile memory may include RAM (Random Access Memory) or external cache memory. By way of illustration instead of limitation, RAM is available in a variety of forms such as SRAM (Static RAM), DRAM (Dynamic RAM), SDRAM (Synchronous DRAM), DDR (Double Data Rate) SDRAM, ESDRAM (Enhanced SDRAM), Synchlink DRAM, RDRAM (Rambus Direct RAM), DRDRAM (Direct RamBus Dynamic RAM), and RDRAM (Rambus Dynamic RAM), etc.

Several implementation methods of the present disclosure are described in the embodiments described above, and these implementation modes are described definitely and in detail, but should not be interpreted as limitations to the patent protection scope of the present disclosure. It should be noted that, the person of ordinary skill in the art may also make some modifications and improvements without breaking away from the inventive concept of the present disclosure, and these modifications and improvements are all included in the protection scope of the present disclosure. Thus, the protection scope of the present disclosure should be determined by the attached claims.

What is claimed is:

1. A method of reducing a FTL address mapping space of flash translation layer implemented on a computer device, comprising steps of:

S1, obtaining a mapping page address and an offset according to a logical page address, wherein mapping page address is abbreviated as mpa;

S2, determining whether the mpa is hit in a cache; performing a step of directly searching a mapping page cache index representing a position of the mpa in the cache, and searching a physical page address with reference to the offset if the mpa is hit in the cache; performing a step of determining whether Not AND is written into the mpa if the mpa is not hit in the cache; wherein mapping page cache index is abbreviated as mpci, Not AND is abbreviated as NAND;

S3, determining whether the NAND is written into the mpa; performing a map load operation if the NAND is written into the mpa; or performing a nomap load operation, returning an invalid mapping if the NAND is not written into the mpa;

S4, performing the nomap load operation, returning an invalid mapping, and turning to perform a step of determining whether a mapping from a logical address to a physical address needs to be modified;

S5, performing the map load operation;

S6, directly searching the mpci representing the position of the mpa in the cache, and searching the physical page address with reference to the offset;

S7, determining whether the mapping from the logical address to the physical address needs to be modified; performing a step of modifying a mapping table corresponding to the mpci in the cache and marking a mapping page corresponding to the mpci as a dirty mapping page, if the mapping from the logical address to the physical address needs to be modified; or terminating operation, if the mapping from the logical address to the physical address need not to be modified; wherein mapping page is abbreviated as mp;

S8, modifying the mapping table corresponding to the mpci in the cache, and marking the mp corresponding to the mpci as the dirty mp;

S9, determining whether to trigger a condition of writing the mp into the NAND;

performing a step of writing the dirty mp into the NAND, if it is determined that the condition of writing the mp into the NAND is triggered; or terminating operation, if it is determined that the condition of writing mp into NAND is not triggered; and S10, writing the dirty mp into the NAND.

2. The method according to claim 1, wherein the mp represents a packet in which page mapping tables and other tables are grouped and ordered according to a certain number and a rule, and the mpa represents a packet number.

3. The method according to claim 1, wherein in the step of determining whether the mpa is hit in the cache; performing the step of directly searching a mpci representing a position of the mpa in the cache, and searching a physical page address with reference to the offset if the mpa is hit in the cache; performing the step of determining whether the NAND is written into the mpa if the mpa is not hit in the cache, which linked list in a hash_list is to be traversed is calculated according the packet number mpa, all mapping page cache indexes in the linked list are traversed with reference to a mapping page address size table until the packet number mpa is found, a current mpci is recorded, failing to find the packet number mpa represents a miss; wherein mapping page cache indexes is abbreviated as mpcis, mapping page address size is abbreviated as mpas.

4. The method according to claim 1, wherein in the step of performing the nomap load operation, returning the invalid mapping and turning to perform the step of determining whether the mapping from the logical address to the physical address needs to be modified, the nomap load operation is fetching the mpci from a header of a clean_list in a list_node and placing the mpci at an end of the clean_list, and then writing an invalid mapping into cache content corresponding to the mpci, updating a mapping page address size table, updating an index mpci with a new packet number mpa, and marking the index mpci as the dirty mp.

5. The method according to claim 1, wherein in the step of performing the map load operation, the map load operation is fetching the mpci from a header of a clean_list in a list_node and placing the mpci at an end of the clean_list, and then replacing cache content corresponding to the mpci with data loaded from the NAND, updating a mapping page address size table, and updating an index mpci with a new packet number mpa.

6. A computer device, comprising a memory, a processor and a computer program stored in the memory and executable by the processor, wherein the processor is configured to execute the computer program to implement steps of:

S1, obtaining a mapping page address and an offset according to a logical page address, wherein mapping page address is abbreviated as mpa;

S2, determining whether the mpa is hit in a cache;

performing a step of directly searching a mapping page cache index representing a position of the mpa in the cache, and searching a physical page address with reference to the offset if the mpa is hit in the cache;

performing a step of determining whether Not AND is written into the mpa if the mpa is not hit in the cache;

wherein mapping page cache index is abbreviated as mpci, Not AND is abbreviated as NAND;

S3, determining whether the NAND is written into the mpa; performing a map load operation if the NAND is written into the mpa; or performing a nomap load operation, returning an invalid mapping if the NAND is not written into the mpa;

S4, performing the nomap load operation, returning an invalid mapping, and turning to perform a step of determining whether a mapping from a logical address to a physical address needs to be modified;

S5, performing the map load operation;

S6, directly searching the mpci representing the position of the mpa in the cache, and searching the physical page address with reference to the offset;

S7, determining whether the mapping from the logical address to the physical address needs to be modified;

performing a step of modifying a mapping table corresponding to the mpci in the cache and marking a mapping page corresponding to the mpci as a dirty mapping page, if the mapping from the logical address to the physical address needs to be modified; or terminating operation, if the mapping from the logical address to the physical address need not to be modified; wherein mapping page is abbreviated as mp, S8, modifying the mapping table corresponding to the mpci in the cache, and marking the mp corresponding to the mpci as the dirty mp;

S9, determining whether to trigger a condition of writing the mp into the NAND; performing a step of writing the dirty mp into the NAND, if it is determined that the condition of writing the mp into the NAND is triggered; or terminating operation, if it is determined that the condition of writing mp into NAND is not triggered; and S10, writing the dirty mp into the NAND.

7. The computer device according to claim 6, wherein the mp represents a packet in which page mapping tables and other tables are grouped and ordered according to a certain number and a rule, and the mpa represents a packet number.

8. The computer device according to claim 6, wherein in the step of determining whether the mpa is hit in the cache; performing the step of directly searching a mpci representing a position of the mpa in the cache, and searching a physical page address with reference to the offset if the mpa is hit in the cache; performing the step of determining whether the NAND is written into the mpa if the mpa is not hit in the cache, which linked list in a hash_list is to be traversed is calculated according the packet number mpa, all mapping page cache indexes in the linked list are traversed with reference to a mapping page address size table until the packet number mpa is found, a current mpci is recorded, failing to find the packet number mpa represents a miss; wherein mapping page cache indexes is abbreviated as mpcis, mapping page address size is abbreviated as mpas.

9. The computer device according to claim 6, wherein in the step of performing the nomap load operation, returning the invalid mapping and turning to perform the step of determining whether the mapping from the logical address to the physical address needs to be modified, the nomap load operation is fetching the mpci from a header of a clean_list in a list_node and placing the mpci at the end of the linked list, and then writing an invalid mapping into cache content corresponding to the mpci, updating a mapping page address size table, updating an index mpci with a new packet number mpa, and marking the index mpci as the dirty mp.

10. The computer device according to claim 6, wherein in, the map load operation is fetching the mpci from a header of a clean_list in a list_node and placing the mpci at an end of the clean_list, and then replacing cache content corresponding to the mpci with data loaded from the NAND, updating a mapping page address size table, and updating an index mpci with a new packet number mpa.

11. A non-transitory computer readable storage medium which stores a computer program, wherein the computer program is configured to, when being executed by a processor, implement steps of:
- S1, obtaining a mapping page address and an offset according to a logical page address, wherein mapping page address is abbreviated as mpa;
- S2, determining whether the mpa is hit in a cache; performing a step of directly searching a mapping page cache index representing a position of the mpa in the cache, and searching a physical page address with reference to the offset if the mpa is hit in the cache; performing a step of determining whether Not AND is written into the mpa if the mpa is not hit in the cache; wherein mapping page cache index is abbreviated as mpci, Not AND is abbreviated as NAND;
- S3, determining whether the NAND is written into the mpa; performing a map load operation if the NAND is written into the mpa; or performing a nomap load operation, returning an invalid mapping if the NAND is not written into the mpa;
- S4, performing the nomap load operation, returning an invalid mapping, and turning to perform a step of determining whether a mapping from a logical address to a physical address needs to be modified;
- S5, performing the map load operation;
- S6, directly searching the mpci representing the position of the mpa in the cache, and searching the physical page address with reference to the offset;
- S7, determining whether the mapping from the logical address to the physical address needs to be modified; performing a step of modifying a mapping table corresponding to the mpci in the cache and marking a mapping page corresponding to the mpci as a dirty mapping page, if the mapping from the logical address to the physical address needs to be modified; or terminating operation, if the mapping from the logical address to the physical address need not to be modified; wherein mapping page is abbreviated as mp;
- S8, modifying the mapping table corresponding to the mpci in the cache, and marking the mp corresponding to the mpci as the dirty mp;
- S9, determining whether to trigger a condition of writing the mp into the NAND; performing a step of writing the dirty mp into the NAND, if it is determined that the condition of writing the mp into the NAND is triggered; or terminating operation, if it is determined that the condition of writing mp into NAND is not triggered;
- S10, writing the dirty mp into the NAND.

12. The non-transitory computer readable storage medium according to claim 11, wherein the mp represents a packet in which page mapping tables and other tables are grouped and ordered according to a certain number and a rule, and the mpa represents a packet number.

13. The non-transitory computer readable storage medium according to claim 11, wherein in the step of determining whether the mpa is hit in the cache; performing the step of directly searching a mpci representing a position of the mpa in the cache, and searching a physical page address with reference to the offset if the mpa is hit in the cache; performing the step of determining whether the NAND is written into the mpa if the mpa is not hit in the cache, which linked list in a hash_list is to be traversed is calculated according the packet number mpa, all mapping page cache indexes in the linked list are traversed with reference to a mapping page address size table until the packet number mpa is found, a current mpci is recorded, failing to find the packet number mpa represents a miss; wherein mapping page cache indexes is abbreviated as mpcis, mapping page address size is abbreviated as mpas.

14. The non-transitory computer readable storage medium according to claim 11, wherein in the step of performing the nomap load operation, returning the invalid mapping and turning to perform the step of determining whether the mapping from the logical address to the physical address needs to be modified, the nomap load operation is fetching the mpci from a header of a clean_list in a list_node and placing the mpci at an end of the clean_list, and then writing an invalid mapping into cache content corresponding to the mpci, updating a mapping page address size table, updating an index mpci with a new packet number mpa, and marking the index mpci as the dirty mp.

15. The non-transitory computer readable storage medium according to claim 11, wherein in the step of performing the map load operation, the map load operation is fetching the mpci from a header of a clean_list in a list_node and placing the mpci at an end of the clean_list, and then replacing cache content corresponding to the mpci with data loaded from the NAND, updating a mapping page address size table, updating an index mpci with a new packet number mpa.

* * * * *